United States Patent Office 3,432,428
Patented Mar. 11, 1969

3,432,428
POLYPHOSPHATE GLASSES AND WATER TREATMENT USES THEREOF
Louis F. Wirth, Jr., Western Springs, and Reed S. Robertson, Glen Ellyn, Ill., assignors to Nalco Chemical Company, Chicago, Ill., a corporation of Delaware
No Drawing. Filed June 24, 1965, Ser. No. 466,853
U.S. Cl. 210—29                 4 Claims
Int. Cl. C02b 1/40

ABSTRACT OF THE DISCLOSURE

Vitreous polyphosphate compositions slowly dissolved by water to protect ferrous metals against corrosion; compositions comprising vitreous, homogeneous fusion product of metal oxide-molecularly dehydrated polyphosphate glasses wherein metal oxides are alkali metal oxide and zinc oxide plus at least one oxide of Mg, Ca, Mg, Al and Si.

---

This invention in general relates to vitreous, polyphosphate compositions and to uses thereof in the treatment of water. More particularly, the invention pertains to metal oxide-polyphosphate glasses which slowly dissolve in water at controlled solubility rates and which, upon dissolving in water at said rates, provide small quantities in the water of polyphosphate chemicals which protect ferrous metals against corrosion by the water in contact therewith.

Distilled water free of dissolved gases is essentially non-corrosive toward ferrous metals such as are used in steel pipes, steel or cast iron pipe fittings, steel tanks, etc., but even distilled water containing dissolved carbon dioxide and/or oxygen can be corrosive toward ferrous and other metals because of the oxidizing effect of the dissolved oxygen. However, most waters used for domestic and industrial purposes are even less ideal, insofar as corrosivity is concerned, than are the aforementioned distilled waters. They almost invariably contain, in addition to dissolved oxygen, dissolved salts occurring therein naturally or provided therein by chemical treatment of water. Commonly-encountered, dissolved, inorganic salts in well waters or municipal waters include the chlorides, sulfates, carbonates, bicarbonates, and silicates of sodium, potassium, calcium, magnesium and iron. These salts, notably the alkali metal and alkaline earth metal salts, can contribute to the corrosion of ferrous metals.

It was known prior to our discoveries herein described that sodium polyphosphates, when dissolved in the water in amounts in the order of 10–20 p.p.m. or higher, as $P_2O_5$, protect ferrous metals in contact with the water against corrosion by the dissolved oxygen and/or aforesaid salts. It was known further that the protection afforded by the polyphosphates was enhanced by the presence of dissolved calcium in the water, e.g., calcium ion which occurs naturally in hard waters. It was known still further that zinc ion has a similar enhancing effect, whereas magnesium ion has little, if any, similar enhancing effect.

Also, water-soluble sodium polyphosphate glasses as a general class and uses thereof in water treatment were known prior to our herein-described discoveries. Such polyphosphate glasses are described, for example, in U.S. Patent Nos. 2,370,342 and 2,370,343, issued Feb. 27, 1945. In said patents, the vitreous, polyphosphate glasses, analytically speaking, are composed of $P_2O_5$, alkali metal oxide (notably $Na_2O$ or $K_2O$) and metal oxides of magnesium, calcium, strontium, barium, aluminum, or iron. These glasses are described as useful in sequestering of hardness elements of water, notably calcium and/or magnesium iron, and the inhibiting or precipitation of insoluble compounds at least certain of said metals. As described in said patents, sodium polyphosphate glasses have several disadvantageous properties for use as such in water treatment, one of which disadvantages is the relatively rapid rate at which they are dissolved in water flowing over or through the glass pieces. One of the purposes in adding the oxides of magnesium, calcium, aluminum, etc., was to modify or control the rate of solution of the polyphosphate glasses so that just enough will be dissolved in the water passing in intimate contact therewith to provide the aforesaid sequestering of calcium iron.

This invention pertains to alkali metal-molecularly dehydrated polyphosphate glass compositions which have particular application in the areas of inhibition of corrosion of ferrous metals by water which is normally corrosive toward said metals. Generically speaking, these compositions may be described as a vitreous glass composition useful in water treatment and comprising a water-soluble, vitreous, homogeneous fusion product of metal oxide-polyphosphate glasses in which the metal oxides consist essentially of alkali metal oxide, zinc oxide and at least one member selected from the group consisting of magnesium oxide, calcium oxide, aluminum oxide and silicon dioxide, said oxides being present as components of the polyphosphates in amounts, based on the glass composition, equivalent to 10–20 mol percent Zn, 1–20 mol percent Mg, 5–20 mol percent Ca, 0.5–10 mol percent Al, 0.5–10 mol percent Si, with the balance of said oxides consisting essentially of said alkali metal oxide.

The alkali metal polyphosphate portion of said glasses provides soluble polyphosphate content. The zinc polyphosphate portion provides soluble zinc polyphosphate, which enhances the corrosion-protective action of the polyphosphate and which has particular efficacy in low calcium hardness waters, e.g., waters with less than about 100 p.p.m. calcium hardness. Calcium hardness is not to be confused with total hardness, which includes also magnesium hardness. The zinc content of the polyphosphate glass compositions of our invention must be at least about 10 mol percent Zn if the enhancement of corrosion inhibition by the polyphosphate is to be realized to its full extent, particularly in essentially completely softened water or water of low calcium hardness, i.e., less than about 100 p.p.m. calcium hardness. Corrosion inhibition by alkali metal polyphosphate glass compositions containing only about 1–5 mol percent Zn is improved, if at all, only slightly in low calcium hardness water in comparison with results obtained without any treatment (blanks). Furthermore, zinc ion from the polyphosphate glass stays in solution better than is the case if zinc ion provided by a source other than said glass.

In any case, one can determine routinely for a particular apparatus at given flow rates and water temperature the particular polyphosphate glass composition of the invention which will dissolve at the rate to maintain the corrosion-inhibiting concentration of polyphosphate in the water. Water temperatures may be in the order of 32–200° F. although the cooler temperatures, e.g., 32–80° F. are preferred because zinc tends to remain in solution better in the cooler waters. In hot water, zinc apparently tends to drop out or deposit out after it has dissolved therein intially. Furthermore, there is less tendency toward undesired hydrolysis of the polyphosphate at the lower water temperatures.

The polyphosphate concentration to be maintained by the rate-controlled dissolving of the polyphosphate glasses in contact therewith depends on the corrosivity of the water, the condition of the ferrous metal surfaces, the temperature of the water, residence time of the water in the system after polyphosphate treatment, and like factors. However, in most situations, a polyphosphate concentration in the water of the aforesaid metal oxide polyphosphates in the order of 10 to 25 p.p.m., as $PO_4$, is adequate. The zinc concentration preferably is maintained at least about one p.p.m., as Zn. A maximum of 5 p.p.m. zinc, as Zn, has been approved as a safe level in water for regular, human consumption, but higher levels than 5 p.p.m. Zn can be tolerated, e.g., up to about 15–20 p.p.m. Zn, particularly if these higher levels occur only occasionally. Magnesium, calcium, aluminum, silicon and/or sodium or potassium concentrations, insofar as derived from the polyphosphate glasses, are well within safe levels for regular human consumption of the water.

The pH of the water treated by the polyphosphate glasses of the invention may be acid, neutral or alkaline, i.e., a pH in the range of about 5.0 to about 10.0. Alkaline water, particularly above about pH 7.5, is less desirable than is approximately neutral water or acid water above about pH 5.0 because the dissolved zinc tends to deposit out or drop out much more rapidly in alkaline water, making it more difficult to maintain in the water the desirable dissolved Zn content of at least about one p.p.m.

Zinc added to the water via the polyphosphate glasses of the invention is less apt to precipitate under these conditions than is zinc added separately to the water via a soluble zinc compound. Addition of zinc to the water via the slowly soluble metal polyphosphate glasses of the invention is an important feature because, in the feeder, there is a high concentration of solids and possibly a relatively high pH, at least part of the time.

As used herein, reference to alkali metal or alkali metal oxide in connection with the compositions of the polyphosphate glasses of this invention means the common alkali metals, i.e., sodium or potassium. Sodium is the preferred alkali metal of said polyphosphate glasses.

A practical use for the polyphosphate glasses of the invention is in the treatment of municipal and/or domestic water. Treatment of the municipal water at the water treatment plant affords protection against corrosion by the municipal water to ferrous metal piping, valves, tanks, couplings, etc., in the water treatment and/or storage apparatus, in municipal distributing mains, tap-in lines, etc., and in ferrous metal piping, couplings, tanks, etc. in the homes or business establishments of the water users. The invention also can be used to advantage in homes or business establishments on an individual basis where such homes or establishments use municipal waters with or without such treatment or have their own water supply, e.g., well water. The invention adapts itself particularly to uses on an individual basis because the polyphosphate treatment requires essentially no attendance other than occasionally refilling a feeder with polyphosphate glass chips or pieces.

As an example thereof, a polyphosphate glass feeder was installed on a test basis in a domestic water system in a home in Western Springs, Ill. It was installed downstream from a domestic water softener containing a conventional ion exchange resin and before the hot water heater. A by-pass line was installed around the softener for selected feed of hard or soft water through the feeder to the hot and cold water distribution system of the home.

The feeder was filled with pieces of sodium-zinc-magnesium polyphosphate glass (15 mol percent Zn and 8 mol percent Mg). The water flowed through the bed of the polyphosphate at the temperature of the supply water, e.g., roughly 47° F. The supply water was alkaline as a result of municipal lime partial softening treatment.

Eighteen days later, a softened water sample from a cold water tap was drawn. It analyzed 16 p.p.m. phosphate, as $PO_4$, and 1.5 p.p.m. zinc, as Zn, with a pH of 8.15. Samples were taken of (A) the hard water supply, (B) soft water without polyphosphate glass treatment and drawn from a cold water tap (both drawn several days earlier), (C) the above-described Na-Zn-Mg polyphosphate glass-treated water, (D) soft water like (B) drawn several days later, and (E) part of the soft water of (D) to which was added 16 p.p.m. as $PO_4$, of a magnesium-sodium polyphosphate (12 mol percent Mg).

The waters were analyzed as follows:

ANALYSIS

| Water | pH | Total $PO_4$, p.p.m. | Zn, p.p.m. |
|---|---|---|---|
| A | 8.25 | | |
| B | 8.3 | | |
| C | 8.15 | 16 | 1.5 |
| D | 8.05 | | |
| E | 7.9 | 16 | |

The above waters were tested for corrosion on mild carbon steel rods. The rods were polished with medium (1/0) emery cloth while being spun at approximately 1750 r.p.m. The polished rods were suspended with the lower ends thereof immersed in the respective test waters in beakers and were rotated at about 1750 r.p.m. Water was fed continuously to the beakers at a rate of 10 ml. per 15 minute period for a total time of about 18 or 20 hours. Beaker overflow was at about the 375 ml. level.

The observations regarding the rust condition of the rods and the color of the beaker waters are reported below.

| Water | Time, hrs. | Rod |
|---|---|---|
| A | 20 | Rust observed within few minutes. |
| B | 20 | Same, but rusting more severe than A. |
| C | 20 | Good in initial periods, traces of rust at end of test. |
| C | 18 | About same as C, 20 hr. test. |
| D | 18 | Rust observed within 10 min., very severe rusting by end of test. |
| E | 18 | Much more rust than C. |

The C waters had considerably less evidence of rust discoloration than did the other waters.

In general, the magnesium, aluminum or silicon content will be selected so that the solubility rate of the polyphosphate glass is a relatively slow rate. A preliminary evaluation can be made by a laboratory soak test in which 100 grams of polyphosphate glass of a mesh less than about ½″ and greater than about ¼″ is immersed in 100 grams of the particular water at about 70–750 F. for about 24 hours or more. The undissolved glass residue should be in the order of 95% or more and preferably around 98–99%.

On a test tap water at 74° F., a polyphosphate glass composition of the invention with 15 mol percent Zn and 5 mol percent Mg had about 93% undissolved residue; with 15 mol percent Zn and 8 mol percent Mg, about 98.5% residue; and with 15 mol percent Zn and 10 mol percent Mg, 100% residue. The 8 mol percent Mg level was considered to be approximately the best level for Mg content for this particular water, based on these preliminary soak tests.

Thus, the invention provides improvements in polyphosphate glass compositions for water treatment at controlled, slow solubility rates capable of keeping the polyphosphate level of the water, as $PO_4$, at a ferrous metal-corrosion inhibiting concentration of about 10 or more p.p.m. and at the desirable zinc level, as Zn, of about 1–5 p.p.m. The invention may be used in the treatment of hard waters, or waters which are softened by ion exchange of sodium ion for calcium ion or other softening processes. In domestic systems which have an ion exchange water softener, the polyphosphate glass treatment may be ahead of or after the softening treatment. The zinc level of the glass-treated water does not appear to be appreciably affected by subsequent ion exchange, water softening resins.

The invention is hereby claimed as follows:

1. A vitreous glass composition useful in water treatment and comprising a water-soluble, vitreous, homogeneous fusion product of metal oxide-molecularly dehydrated polyphosphate glasses in which the metal oxides consist essentially of sodium oxide, zinc oxide and magnesium oxide, said oxides being present in amounts, based on said glass composition, equivalent to 10–20 mol percent Zn and 5–10 mol percent Mg, with the balance of said oxides consisting essentially of sodium oxide.

2. A process for treating water to inhibit its corrosivity toward ferrous metals, which process comprises bringing the water into intimate contact with small pieces of a water-soluble, vitreous, homogeneous fusion product of metal oxide-molecularly dehydrated polyphosphate glasses in which the metal oxides consist essentially of sodium oxide, zinc oxide and magnesium oxide, said oxides being present in amounts, based on said glass composition, equivalent to 10–20 mol percent Zn and 5–10 mol percent Mg, with the balance of said oxides consisting essentially of sodium oxide, and thereby dissolving in the water a corrosion-inhibiting quantity of the metal oxide-molecularly dehydrated polyphosphates of said glass.

3. A process as claimed in claim 2 wherein said water has less than 100 p.p.m. calcium hardness, as $CaCO_3$.

4. A process as claimed in claim 2 wherein said water which contacts said small pieces contains more than 100 p.p.m. calcium hardness, as $CaCO_3$, and subsequently replacing most of said calcium hardness with sodium ion by ion exchange with a cation exchanger in the sodium form.

References Cited

UNITED STATES PATENTS 2,977,313   3/1961   Roland et al.   21—2.7 X
3,043,772   7/1962   Liddell   210—57

FOREIGN PATENTS 1,351,943   12/1963   France.

MICHAEL E. ROGERS, *Primary Examiner.*

U.S. Cl. X.R.

21—2.7; 210—57; 252—178, 387